Patented Feb. 15, 1927.

1,618,051

UNITED STATES PATENT OFFICE.

OVIE E. BRADLEY, OF ELMO, MISSOURI.

VETERINARY MEDICINE.

No Drawing. Application filed November 13, 1924. Serial No. 749,767.

This invention relates to the class of medicines and pertains particularly to the class of veterinary medicines.

The primary object of this invention is the provision, in a manner as hereinafter set forth, of a medicinal compound for the treatment of the disease known as necrosis, necrosis-enteritis and necrosis-bacillosis, commonly found in swine.

The necrotic condition which this compound is intended to cure exists chiefly in the intestines of the animal and has been found very difficult to overcome. However, the compound hereinafter to be disclosed has been found very efficacious through the use of an ingredient, well known in itself and having in natural combination therewith substances which have a wide range of action in the field of medicine, when extracted therefrom and used separately, or when used in combination. This substance is the ordinary and well known soft coal, which applicant uses in conjunction with other medicinal and efficient substances, unchanged, or in other words, containing all of the oily and volatile matter originally contained therein.

The compound forming the subject matter of this invention comprises soft coal, calcium carbonate, sodium chloride, sulphur, copperas (ferrous sulphate), and bicarbonate of soda. These ingredients are combined in approximately the following proportions:—

| | Parts |
|---|---|
| Soft coal (containing all of its natural constitutents unchanged) | 70 |
| Calcium carbonate | 14 |
| Sodium chloride | 8 |
| Sulphur | 2½ |
| Copperas (ferrous sulphate) | 2½ |
| Bicarbonate of soda | 3 |
| Total | 100 |

These ingredients are thoroughly mixed together and the resultant mixture is then ground to a powder thereby more completely mixing the ingredients and further reducing the same to a condition which will adapt it to ready consumption by the animal.

The powder thus formed is placed in a self feeder and the same is located at a point where the animals, which are to be treated, will have ready access to the same and the animals are allowed to eat freely of the compound for a period of two or three weeks.

Applicant is aware of the fact that sulphur, copperas and bicarbonate of soda have before been used in combination for the treatment of the intestinal disease of hogs, known as hog cholera but, is not aware that the compound set forth herein has ever before been used and particularly for the relief of necrotic conditions of the intestines of animals. The disease for which this compound is intended is different from the disease known as hog cholera although the two diseases are primarily diseases of the intestines and the ingredients of this compound in so far as applicant is aware, have never before been known to have been used in the treatment of this particular disease.

In the use of soft coal, which forms the basic ingredient of applicant's compound, many advantages are obtained, as the carbon and the bulk of the coal give to the compound a scouring action upon the inner surface of the intestines, the oily constituents of the coal act as lubricating mediums, the phenolic constituents act in an antiseptic manner upon the affected membrane, and many other ingredients are found in the coal which would produce a stimulating and tissue building effect upon the affected parts with which the compound comes in contact through direct action or the action of the blood surrounding the part which has been cleansed and purified by the various constituents of the compound From the foregoing description it will be readily seen that there has been compounded a medicine which will be particular efficacious in the treatment of the diseases mentioned, acting to save the lives of many animals previously lost because of the ravages of this disease.

Having thus described my invention what I claim is:

1. A compound for the treatment of necrotic conditions in animals, containing powdered soft coal as its primary constituent.

2. A compound for the treatment of necrotic conditions in animals, comprising soft coal, calcium carbonate, sodium chloride, sulphur, copperas, and sodium bicarbonate, intimately and thoroughly mixed and in powdered form.

3. A compound for the treatment of necrotic conditions in the intestines of animals, comprising a powdered mixture of calcium carbonate, sodium chloride, sulphur, copperas, sodium bicarbonate, and soft coal forming 70 per cent of the completed compound.

4. A compound for the treatment of necrotic conditions in the intestines of swine, comprising the ingredients herein set forth in approximately the following proportions, and in powdered form soft coal, containing all of its natural constituents, 70 parts, calcium carbonate, 14 parts, sodium chloride, 8 parts, sulphur, 2½ parts, copperas, 2½ parts, and sodium bicarbonate, 3 parts.

In testimony whereof, I affix my signature hereto.

OVIE E. BRADLEY.